United States Patent
Nishihata (10) Patent No.: US 11,940,116 B2
(45) Date of Patent: Mar. 26, 2024

(54) VEHICLE LAMP

(71) Applicant: Ichikoh Industries, Ltd., Isehara (JP)

(72) Inventor: Koji Nishihata, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 18/000,263

(22) PCT Filed: May 26, 2021

(86) PCT No.: PCT/JP2021/020038
§ 371 (c)(1),
(2) Date: Nov. 29, 2022

(87) PCT Pub. No.: WO2021/241644
PCT Pub. Date: Dec. 2, 2021

(65) Prior Publication Data
US 2023/0220970 A1    Jul. 13, 2023

(30) Foreign Application Priority Data
May 29, 2020  (JP) ................. 2020-094788

(51) Int. Cl.
*F21S 43/19*    (2018.01)
*F21S 43/247*   (2018.01)

(52) U.S. Cl.
CPC ........... *F21S 43/195* (2018.01); *F21S 43/247* (2018.01)

(58) Field of Classification Search
CPC ................. F21S 43/247; F21S 43/195
See application file for complete search history.

(56) References Cited

U.S. PATENT DOCUMENTS 10,215,360 B1* 2/2019 Grogan ................ F21S 43/247
2014/0160777 A1* 6/2014 Mugge ................... F21S 43/40
                                                                    362/508

(Continued)

FOREIGN PATENT DOCUMENTS

EP    2 960 574 81     7/2017
JP    2016-12460 A     1/2016

(Continued)

OTHER PUBLICATIONS

International Search Report dated Jul. 13, 2021, in PCT/JP2021/020038, filed on May 26, 2021, 2 pages.

(Continued)

*Primary Examiner* — Christopher E Dunay
(74) *Attorney, Agent, or Firm* — Oblon, McClelland, Maier & Neustadt, L.L.P.

(57) ABSTRACT

To improve the sense of connection between a fixed-side lamp unit and a movable-side lamp unit. A vehicle lamp includes; a fixed-side unit, and a movable-side unit, the fixed-side unit has: a first light source; a first light guide body; and a first outer lens having a first front surface part, and a first leg part, the movable-side unit has: a second light source; and a second light guide body; and a second outer lens having a second front surface part, and a second leg part, the second leg part has a light control surface, and the light control surface performs control such that light emitted from at least one of the first light source and the second light source and incident on the light control surface passes through inside of the second leg part and is emitted from a front surface side of the second leg part.

6 Claims, 5 Drawing Sheets

(56) References Cited

U.S. PATENT DOCUMENTS

| | | | |
|---|---|---|---|
| 2015/0345731 A1* | 12/2015 | Noritake | B60Q 1/0041 |
| | | | 362/516 |
| 2016/0138773 A1* | 5/2016 | Kawabata | F21S 43/249 |
| | | | 362/511 |
| 2016/0207446 A1* | 7/2016 | Kumegawa | B60Q 1/0035 |
| 2016/0208995 A1* | 7/2016 | Yoshino | B60Q 1/0041 |

FOREIGN PATENT DOCUMENTS

| | | |
|---|---|---|
| JP | 2016-105420 A | 6/2016 |
| JP | 6159166 B2 | 7/2017 |

OTHER PUBLICATIONS

Extended European Search Report dated Jan. 3, 2024 issued in European Patent Application No. 21812410.5 filed on May 26, 2021, total 27 pages.

Japanese Notice of Reasons for Refusal dated Dec. 12, 2023 issued in Japanese Patent Application No. 2020-094788 filed on May 29, 2020, with English translation, total 9 pages.

* cited by examiner

FRONT (BACK SURFACE)
↕
REAR (FRONT SURFACE)

TOP ⊙   ⊗ BOTTOM   LEFT ⟷ RIGHT

FIG. 7

VEHICLE LAMP

TECHNICAL FIELD

The present invention relates to a vehicle lamp.

BACKGROUND ART

Conventionally, there is known a vehicle lamp that is disposed over the vehicle body side and the back door side at the rear of a vehicle (for example, see PTL 1). Such a vehicle lamp includes a lamp unit on the vehicle body side and a lamp unit on the back door side.

CITATION LIST

Patent Literature

PTL 1: U.S. Pat. No. 6,159,166

SUMMARY OF THE INVENTION

Problems to be Solved by the Invention

A vehicle lamp described in PTL 1 is disposed with a gap between a lamp unit on the vehicle body side and a lamp unit on the back door side. In the vehicle lamp disposed between the fixed side and the movable side of the vehicle in this manner, there is a demand for a configuration of enhancing the sense of connection between the lamp unit on the fixed side and the lamp unit on the movable side.

The present invention is made in view of the above, and an object of the present invention is to provide a vehicle lamp capable of improving the sense of connection between a lamp unit on the fixed side and a lamp unit on the movable side.

Means for Solving the Problem

A vehicle lamp according to present invention includes: a fixed-side unit that is disposed in a fixing part of a vehicle having the fixing part and a movable part, and emits light; and a movable-side unit that is disposed in the movable part with a gap between the fixed-side unit and the movable-side unit, and emits light, the fixed-side unit has: a first light source; a first light guide body that guides light of the first light source; and a first outer lens having a first front surface part covering a front surface side of the first light guide body when the vehicle lamp is mounted on the vehicle, and a first leg part covering a side surface on a gap side of the first light guide body, the movable-side unit has: a second light source; and a second light guide body that guides light of the second light source; and a second outer lens having a second front surface part covering a front surface side of the second light guide body when the vehicle lamp is mounted on the vehicle, and a second leg part covering a side surface on the gap side of the second light guide body, the second leg part has a light control surface in a part facing the second light guide body, and the light control surface performs control such that light emitted from at least one of the first light source and the second light source and incident on the light control surface passes through inside of the second leg part and is emitted from a front surface side of the second leg part.

The light control surface may be provided in a part facing the second light guide body of the second leg part.

The light control surface may refract, inside the second leg part, the light that is emitted from the second light guide body and is incident on the light control surface.

The light control surface may internally reflect light that is emitted from the first light source, be incident inside the second leg part from the gap side, and be incident on the light control surface from inside of the second leg part.

The first leg part may have a refractive surface that refracts, inside the first leg part, light emitted from the first light guide body.

The light control surface may perform control such that light which reaches the light control surface is internally reflected on a surface on the gap side of the second leg part.

The light control surface may have a serrate cross-sectional shape in a case where the second leg part is cut by a plane parallel to a horizontal plane when the vehicle lamp is mounted on the vehicle.

Effect of the Invention

According to the present invention, it is possible to improve the sense of connection between a lamp unit on the fixed side and a lamp unit on the movable side.

BRIEF DESCRIPTION OF THE DRAWINGS

FIG. 5 is a diagram schematically illustrating an example of a path of light when the vehicle lamp is turned on.

FIG. 6 is a diagram schematically illustrating an example of a path of light when the vehicle lamp is turned on.

FIG. 7 is a diagram schematically illustrating an example of a state in which the vehicle lamp is turned on.

MODE FOR CARRYING OUT THE INVENTION

Hereinafter, an embodiment of a vehicle lamp according to the present invention will be described with reference to the drawings. The present invention is not limited by this embodiment. Components in the following embodiment include those that can be easily replaced by those skilled in the art, or those that are substantially the same.

Figure 1:
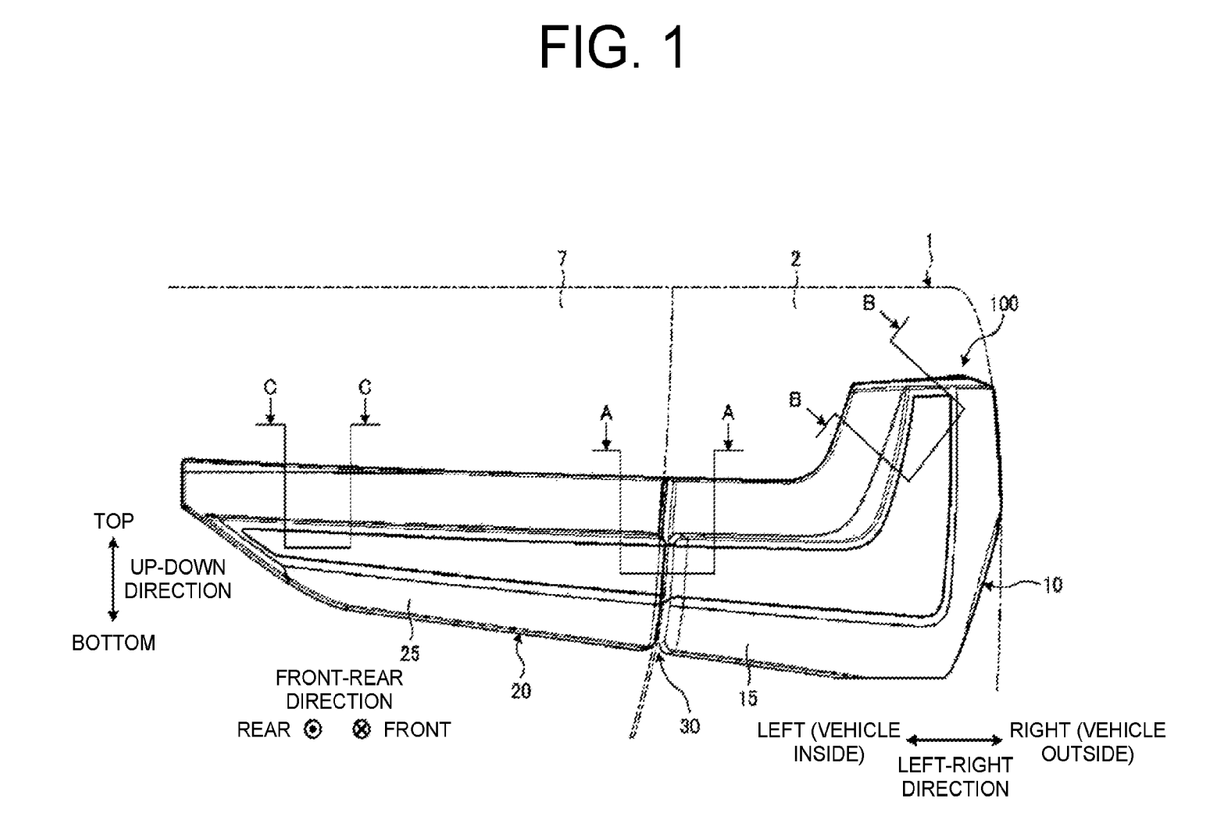
FIG. 1 is a diagram illustrating an example of a vehicle lamp as viewed from the rear side of a vehicle.

FIG. 1 is a diagram illustrating an example of a vehicle lamp 100 as viewed from the rear side of a vehicle 1. As illustrated in FIG. 1, the vehicle 1 includes a vehicle body 2 having a traveling device (not illustrated), and the vehicle lamp 100. The vehicle body 2 has a driver's cab. This vehicle body 2 is supported on the traveling device. The traveling device has wheels on which tires are mounted, a steering device for changing the traveling direction of the vehicle 1, and a braking device for slowing down or stopping the traveling device. The vehicle 1 includes a door for getting on and off that is provided on the side part of the vehicle body 2, and a back door 7 that is provided on the rear part of the vehicle body 2. The door for getting on and off, and the back door 7 are each movably supported on the vehicle body 2 via a hinge mechanism.

In the following description, assuming that the vehicle 1 is disposed on the ground parallel to a horizontal plane, and the positional relationship of each part will be described using terms, namely, front, rear, top, bottom, left, and right with a driver in a cab as a reference. The front-rear, up-down, and left-right directions are the directions when the vehicle lamp is mounted on the vehicle and the traveling direction of the vehicle is viewed from the driver's seat. In this embodiment, the up-down direction is parallel to the vertical direction, and the front-rear and left-right directions are parallel to the horizontal direction.

In this embodiment, the vehicle lamps 100 are provided on the left and right sides of the rear part of the vehicle body 2. In this embodiment, each vehicle lamp 100 is provided on the rear part of the vehicle body 2. Therefore, the rear side in the front-rear direction is the front surface side of the vehicle lamp 100, and the front side in the front-rear direction is the back surface side of the vehicle lamp 100.

The vehicle lamp 100 includes a function lamp. Examples of the function lamp include a tail lamp that is provided in the rear part of the vehicle body 2 and lights up in conjunction with the lighting of a headlamp, a stop lamp that is provided in the rear part of the vehicle body 2 and lights up in conjunction with operation of a brake device, and a rear turn signal lamp that is provided in the rear part of the vehicle body 2 and lights up to indicate the traveling direction of the vehicle 1 to the surroundings.

The vehicle lamps 100 are each disposed over the vehicle body 2 side and the back door 7 side. In this embodiment, the vehicle body 2 is a fixing part. The back door 7 is a movable part. A structure of the vehicle lamp 100 provided on the left side of the rear part of the vehicle body 2 and a structure of the vehicle lamp 100 provided on the right side of the rear part of the vehicle body 2 are symmetrical in the left-right direction and are substantially the same. Hereinafter, the vehicle lamp 100 provided on the right side of the rear part of the vehicle body 2 will be mainly described, and the description of the vehicle lamp 100 provided on the left side of the rear part of the vehicle body 2 will be simplified or omitted.

Figure 2:
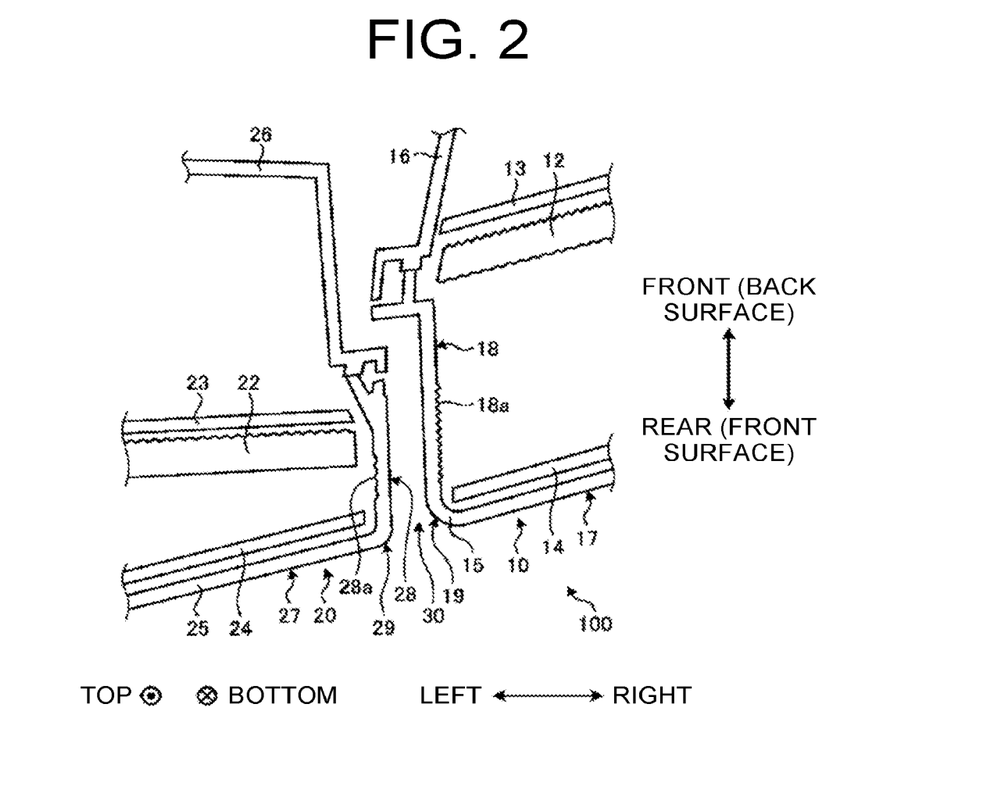
FIG. 2 is a diagram illustrating a configuration taken along the A-A section in FIG. 1.
Figure 3:
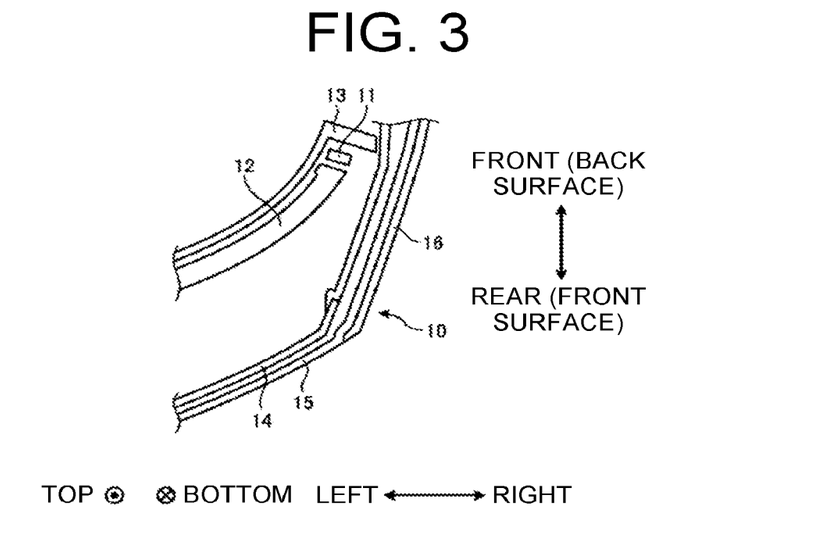
FIG. 3 is a diagram illustrating a configuration taken along the B-B section in FIG. 1.
Figure 4:
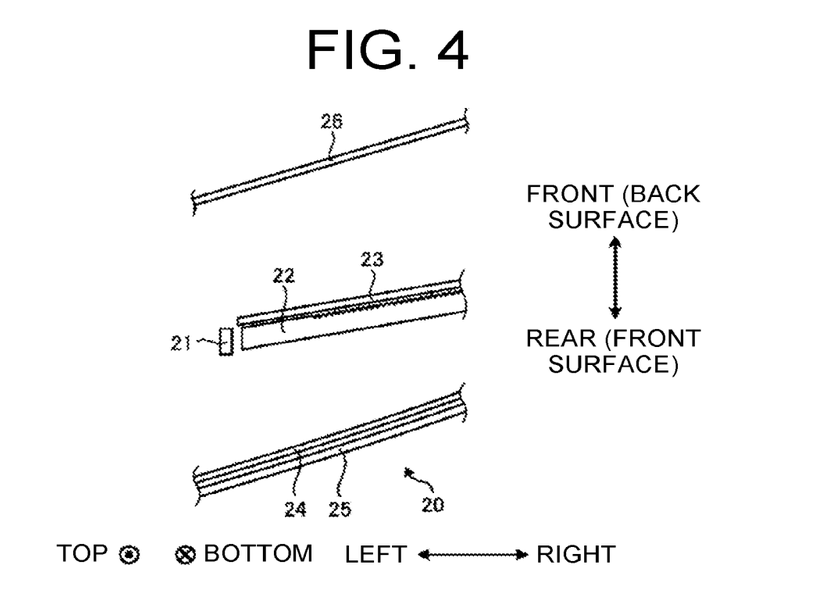
FIG. 4 is a diagram illustrating a configuration taken along the C-C section in FIG. 1.

FIG. 2 to FIG. 4 are diagrams each schematically illustrating an example of the vehicle lamp 100 according to this embodiment. FIG. 2 is a diagram illustrating a configuration taken along the A-A section in FIG. 1. FIG. 3 is a diagram illustrating a configuration taken along the B-B section in FIG. 1. FIG. 3 is a diagram illustrating a configuration taken along the C-C section in FIG. 1.

The vehicle lamp 100 illustrated in FIG. 2 to FIG. 4 includes a fixed-side unit 10 disposed on the vehicle body 2 side, which is a fixing part, and a movable-side unit 20 disposed on the back door 7 side, which is a movable part. The fixed-side unit 10 and the movable-side unit 20 are separated by a gap 30.

The fixed-side unit 10 includes a light source (first light source) 11, a light guide body (first light guide body) 12, an inner housing 13, an inner lens 14, an outer lens (first outer lens) 15, and a lamp housing 16.

The light source 11 is a semiconductor type light source, for example, an LED or the like. The light source 11 supplies light to the fixed-side unit 10.

The light guide body 12 emits light from the light source 11 toward the front surface side (rearward). The light guide body 12 has an end surface 12a at an end on the back door 7 side (movable side, left). In the light guide body 12, one part of the light from the light source 11 is emitted to the left from the end surface 12a. The end surface 12a is, for example, planar. The end surface 12a is provided at an end on the left of the light guide body 12, so that the one part of the light from the light source 11 can be efficiently emitted to the left.

The inner housing 13 holds the light guide body 12. The inner housing 13 is disposed on the back surface side of the light guide body 12. The inner housing 13 may have a reflective member on a surface 13a on the front surface side. In this case, light emitted from the light guide body 12 to the back surface side can be reflected on the front surface side.

The inner lens 14 transmits the light emitted from the light guide body 12. The inner lens 14 is disposed so as to cover the front surface side of the light guide body 12.

The outer lens 15 emits the light emitted from the inner lens 14 to the outside of the vehicle lamp 100. The outer lens 15 has a plate-like shape, and a part facing the gap 30 is bent in an L-shape in a cross-sectional view. The outer lens 15 houses each part of the vehicle lamp 100 together with the lamp housing 16. The outer lens 15 is formed, for example, using a resin material that is transparent or similar in color to lighting color.

The outer lens 15 has a front surface part (first front surface part) 17 and a leg part (first leg part) 18. The front surface part 17 is disposed on the front surface side of the inner lens 14. The leg part 18 is disposed on the lateral side (left side) on the back door 7 side of the light guide body 12. The leg part 18 is a part that extends from the end on the gap side of the front surface part 17 toward the back surface side. The leg part 18 has a connecting part 19 connected to the front surface part 17. The connecting part 19 has a rounded shape in cross section.

The leg part 18 has a refractive surface 18a. The refractive surface 18a refracts, inside the leg part 18, the light that is emitted from the light guide body 12 and reaches the leg part 18. The light refracted inside the leg part 18 from the refractive surface 18a passes through the leg part 18 and is emitted to the gap 30 side. The light emitted to the gap 30 side is incident on a leg part 28, which will be described later. The refractive surface 18a is formed from the back surface side to the front surface side, for example, in a range from a position corresponding to a front surface side end of the light guide body 12 to a back surface side end of the connecting part 19. The position of the end on the back surface side of the refractive surface 18a can be appropriately set in accordance with the position of a light control surface 28a, which will be described later. That is, the position of the end on the back surface side of the refractive surface 18a can be appropriately set to, for example, a position where the light from the light guide body 12 can be incident on the light control surface 28a, which will be described later.

The refractive surface 18a has, for example, a serrate cross-sectional shape. The cross-sectional shape of the light control surface 28a is not limited to the serrate shape, and may be any other shape as long as light can be refracted as described above. Of the surface on the light guide body 12 side of the leg part 18, a portion other than the portion on which the refractive surface 18a is provided may have an emboss-finished shape, for example.

The movable-side unit 20 includes a light source (second light source) 21, a light guide body (second light guide body) 22, an inner housing 23, an inner lens 24, an outer lens (second outer lens) 25, and a lamp housing 26.

The light source 21 is a semiconductor type light source, for example, an LED or the like. The light source 21 supplies light to the movable-side unit 20. The light guide body 22 emits light from the light source 21 toward the front surface side (rearward). The inner housing 23 holds the light guide body 22. The inner lens 24 transmits the light emitted from the light guide body 22.

The light source 21 is a semiconductor type light source, for example, an LED or the like. The light source 21 supplies light to the movable-side unit 20. The light guide body 22 emits light from the light source 21 toward the front surface side (rearward). The inner housing 23 holds the light guide body 22. The inner lens 24 transmits the light emitted from the light guide body 22.

The outer lens 25 emits the light emitted from the inner lens 24 to the outside of the vehicle lamp 100. The outer lens 25 has a plate-like shape, and a part facing the gap 30 is bent in an L-shape in a cross-sectional view. The outer lens 25 houses each part of the vehicle lamp 100 together with the lamp housing 26. The outer lens 25 is formed, for example, using a resin material that is transparent or similar in color to lighting color.

The outer lens 25 has a front surface part (second front surface part) 27, and a leg part (second leg part) 28. The front surface part 27 is disposed on the front surface side of the inner lens 24. The leg part 28 is disposed on the lateral side (left side) on the back door 7 side of the light guide body 22. The leg part 28 is a part that extends from the end on the gap 30 side of the front surface part 27 toward the back surface side. The leg part 28 has a connecting part 29 connected to the front surface part 27. The connecting part 29 has a rounded shape in cross section.

The leg part 28 has the light control surface 28a. The light control surface 28a is provided on a surface on the light guide body 22 side in the leg part 28. The light control surface 28a refracts, inside the leg part 28, the light that is emitted from the light guide body 22 and incident on the light control surface 28a. The light control surface 28a internally reflects the light that is emitted from the light source 11, is incident inside the leg part 28 from the gap 30 side, and is incident on the light control surface 28a from the inside of the leg part 28. The light control surface 28a is formed from the back surface side to the front surface side, for example, in a range from a position corresponding to a front surface side end of the light guide body 22 to a back surface side end of the connecting part 29.

The light control surface 28a performs control such that light which reaches the light control surface 28a, that is, light which is emitted from the light guide body 22 and reaches the light control surface 28a, and light which is emitted from the fixed-side unit 10 toward the gap 30 and reaches the light control surface 28a from the inside of the leg part 28 is internally reflected by a surface 28b on the gap 30 side of the leg part 28. The light control surface 28a has, for example, a serrate cross-sectional shape. The cross-sectional shape of the light control surface 28a is not limited to the serrate shape, and may be any other shape as long as light can be controlled as described above. Of the surface on the light guide body 22 side of the leg part 28, a portion other than the portion on which the light control surface 28a is provided may have an emboss-finished shape, for example.

In this embodiment, the diameter of the connecting part 29 is smaller than the diameter of the connecting part 19 in the outer lens 25 of the fixed-side unit 10. According to this configuration, it is possible to prevent a curved portion from extending to the front side (back surface side) of the leg part 28. In a case where the connecting part 29 has such a shape as to extend forward from the leg part 28, the light controlled by the light control surface 28a is more likely to be internally reflected by the connecting part 29. When the light controlled by the light control surface 28a is reflected by the connecting part 29, the reflected light goes around to the front surface part 27 side and is emitted from the front surface side 27. In this embodiment, the diameter of the connecting part 29 of the outer lens 25 is suppressed, and therefore the light controlled by the light control surface 28a is prevented from going around to the front surface part 27 side, and can be reliably emitted from the front surface side of the leg part 28.

Now, an example of operation of the vehicle lamp 100 configured as described above will be described. When a driver performs predetermined operation such as operation of a direction indicator on the vehicle side or operation of a hazard switch, the vehicle lamp 100 emits light from each of the light source 11 of the fixed-side unit 10 and the light source 21 of the movable-side unit 20 in accordance with the above operation.

Figure 5:
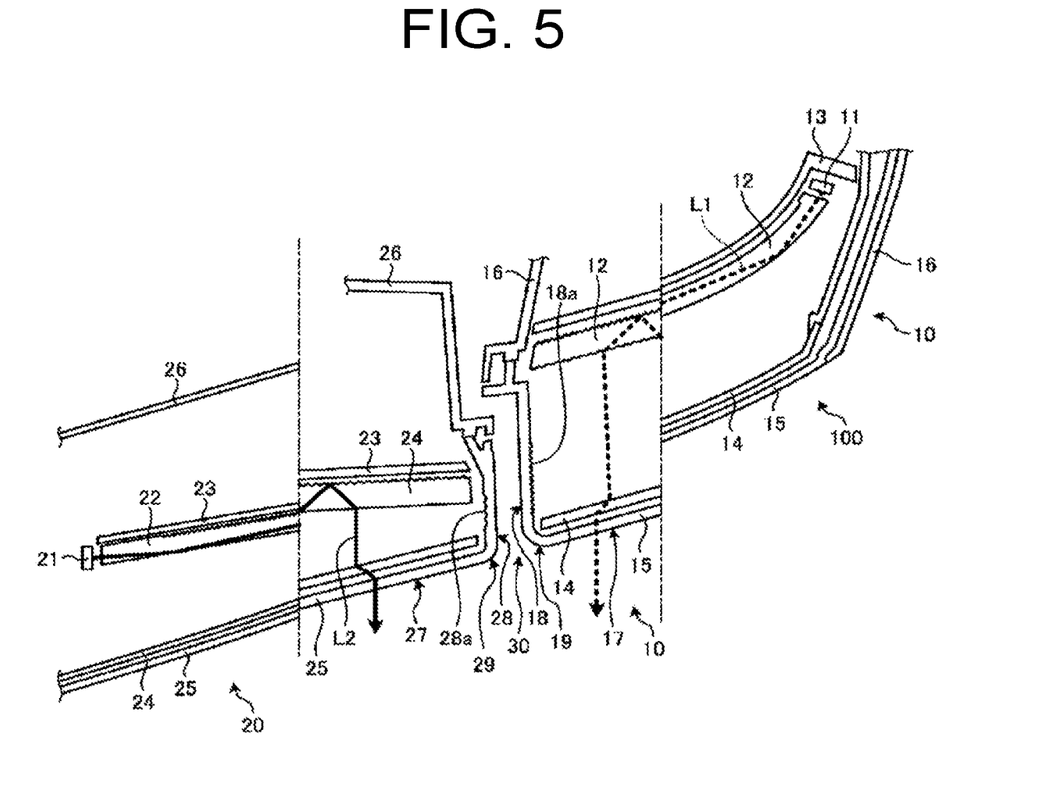
Figure 6:
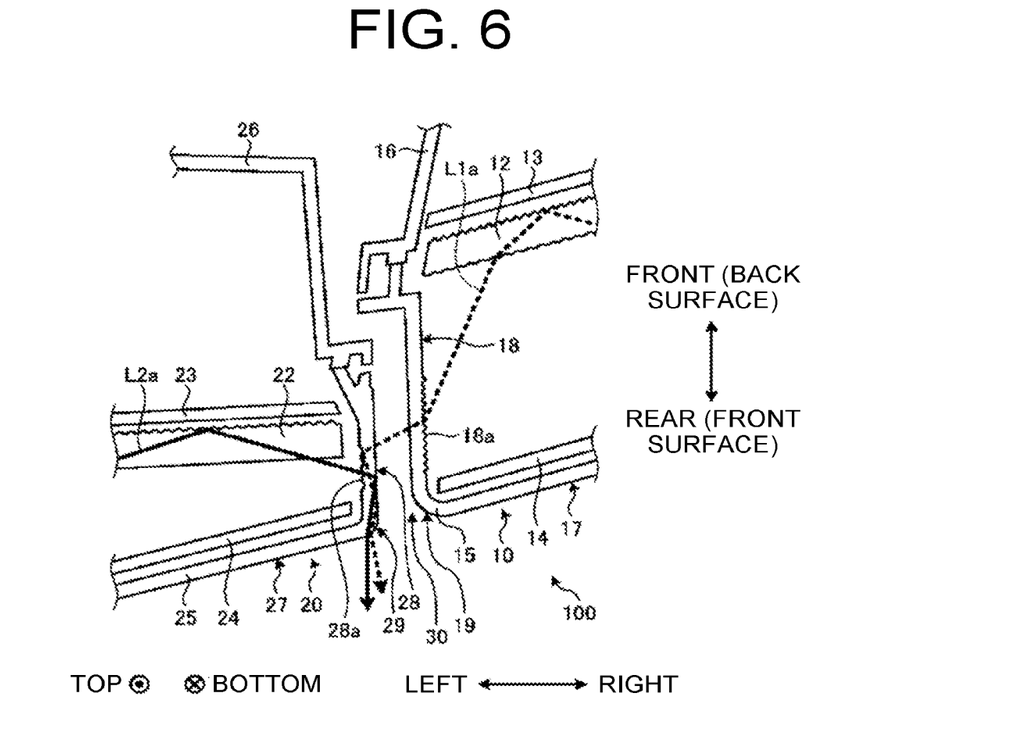

FIG. 5 and FIG. 6 are diagrams each schematically illustrating an example of a path of light in a case where the vehicle lamp 100 is turned on. As illustrated in FIG. 5, light emitted from the light source 11 of the fixed-side unit 10 is incident on the light guide body 12 and is guided by the light guide body 12. A part of this light is emitted from the light guide body 12 to the front surface side, passes through an inner front surface part 14a of the inner lens 14, and is emitted from an outer front surface part 15a of the outer lens 15 to the front. Consequently, a lighting area AR1 (see FIG. 7) on the outer front surface part 15a is illuminated.

As illustrated in FIG. 5, light emitted from the light source 21 of the movable-side unit 20 is incident on the light guide body 22, and guided by the light guide body 22. This light is emitted from the light guide body 22, passes through the inner lens 24, and is emitted from the outer lens 25 to the front. Consequently, a lighting area AR2 (see FIG. 7) on the outer lens 25 is illuminated.

On the other hand, as illustrated in FIG. 6, light L1a, which is part of light L1 guided by the light guide body 12, is emitted from, for example, the light guide body 12, reaches the leg part 18 of the outer lens 15, and is incident on the leg part 18 by the refractive surface 18a provided on the leg part 18. This light L1a passes through the inside of the leg part 18, is emitted toward the gap 30, is incident inside the leg part 28 of the outer lens 25 of the movable-side unit 20, and reaches the light control surface 28a from the inside of the leg part 28. The light L1a is internally reflected to the front surface side by the light control surface 28a. This light L1a travels inside the leg part 28, is further internally reflected by the surface on the gap 30 side of the leg part 28, and is emitted from the front surface side of the leg part 28.

As illustrated in FIG. 6, light L2a, which is part of light L2 guided by the light guide body 22, is emitted from, for example, the light guide body 22, and reaches the light control surface 28a of the outer lens 25 from the outside. The light L2a that reaches the light control surface 28a is refracted to the front surface side inside the leg part 28 by the light control surface 28a. This light L2a travels inside the leg part 28, is further internally reflected by the surface on the gap 30 side of the leg part 28, and is emitted from the front surface side of the leg part 28.

A lighting area AR3 on the outer lens 25 is illuminated by the above light L1a and light L2a.

Figure 7:
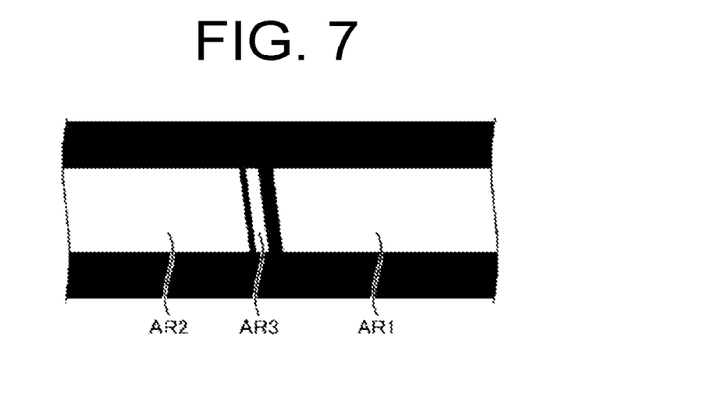

FIG. 7 is a diagram illustrating an example of a state in which the vehicle lamp 100 is turned on. As illustrated in FIG. 7, in the vehicle lamp 100, the light control surface 28a is provided, so that the lighting area AR3 is formed on the front surface side of the leg part 28. In this case, in the vehicle lamp 100, the lighting area AR1 is formed in the front surface part 17 of the outer lens 15 of the fixed-side unit 10, the lighting area AR2 is formed in the front surface part 27 of the outer lens 25 of the movable-side unit 20, the lighting area AR3 is formed on the front surface side of the leg part 28 of the outer lens 25. Therefore, the impression that the lighting area AR1 and the lighting area AR2 are connected by the lighting area AR3 can be given to a viewer.

As described above, the vehicle lamp 100 according to this embodiment includes: the fixed-side unit 10 that is disposed in the fixing part (vehicle body 2) of the vehicle having the fixing part and the movable part (back door 7), and emits light; and the movable-side unit 20 that is disposed in the movable part with the gap 30 between the fixed-side unit 10 and the movable-side unit 20, and emits light, the fixed-side unit 10 has: the light source 11; the light guide body 12 that guides light of first light source 11; and the outer lens 15 that has the front surface part 17 covering the front surface side of the light guide body 12 when the vehicle lamp is mounted on the vehicle; and the leg part 18 covering the side surface on the gap 30 side of the light guide body 12, the movable-side unit 20 has: the light source 21; and the light guide body 22 that guides light of the light source 21; and the outer lens 25 having the front surface part 27 covering the front surface side of the light guide body 22 when the vehicle lamp is mounted on the vehicle, and the leg part 28 covering the side surface on the gap 30 side of the light guide body 22, the leg part 28 has the light control surface 28a in the part facing the light guide body 22, and the light control surface 28a performs control such that light emitted from at least one of the light source 11 and the light source 21 and incident on the light control surface 28a passes through inside of the leg part 28 and is emitted from the front surface side.

According to this configuration, the light emitted from at least one of the light source 11 and the light source 21 and incident on the light control surface 28a passes through the inside of the leg part 28 and is emitted from the front surface side, and therefore the lighting area AR3 is formed on the front surface side of the leg part 28. That is, the lighting area AR1 is formed in the front surface part 17 of the outer lens 15 of the fixed-side unit 10, the lighting area AR2 is formed in the front surface part 27 of the outer lens 25 of the movable-side unit 20, and the lighting area AR3 is formed on the front surface side of the leg part 28. Therefore, the impression that the lighting area AR1 and the lighting area AR2 are connected by the lighting area AR3 can be given to a viewer. Consequently, it is possible to improve the sense of connection between the fixed-side unit 10 and the movable-side unit 20.

In the vehicle lamp 100 according to this embodiment, the light control surface 28a may be provided in the part facing the light guide body 22 of the leg part 28. Consequently, the light control surface 28a is not disposed at such a position as not to be able to be seen directly from the outside, and therefore it is possible to avoid deterioration in appearance.

In the vehicle lamp 100 according to this embodiment, the light control surface 28a may refract, inside the leg part 28, the light that is emitted from the light guide body 22 and is incident on the light control surface 28a. Consequently, the light that is emitted from the light guide body 22 and reaches the leg part 28 can be used without waste.

In the vehicle lamp 100 according to this embodiment, the light control surface 28a may internally reflect light that is emitted from the light source 11, be incident inside the leg part 28 from the gap 30 side, and be incident on the light control surface 28a from inside of the leg part 28. The light emitted from the fixed-side unit 10 can also be used for the lighting area AR3, and therefore it is possible to ensure sufficient brightness for the lighting area AR3.

In the vehicle lamp 100 according to this embodiment, the leg part 18 may have the refractive surface 18a that refracts, inside the first leg part 18, light emitted from the first light guide body 12. Consequently, the light that is emitted from the light guide body 12 and reaches the leg part 18 can be efficiently supplied to the light control surface 28a side.

In the vehicle lamp 100 according to this embodiment, the light control surface 28a may perform control such that light which reaches the light control surface 28a is internally reflected on a surface on the gap 30 side of the leg part 28. Consequently, the light controlled by the light control surface 28a can reliably reach the front surface side from the inside of the leg part 28.

In the vehicle lamp 100 according to this embodiment, the light control surface 28a may have a serrate cross-sectional shape in a case where the leg part 28 is cut by a plane parallel to a horizontal plane when the vehicle lamp is mounted on the vehicle. Consequently, a controllable configuration can be easily formed such that the light incident on the light control surface 28a passes through the inside of the leg part 28 and is emitted from the front surface side.

The technical scope of the present invention is not limited to the above embodiment, and modifications can be made as appropriate without departing from the scope of the present invention. For example, the light control surface 28a performs control such that both the light L1a and the light L2a are supplied to the front surface side of the leg part 28 in the above embodiment, but the present invention is not limited to this. The light control surface 28a may be able to supply at least one of the light L1a and the light L2a to the front surface side of the leg part 28.

In the above embodiment, the refractive surface 18a is formed in the leg part 18. However, for example, the refractive surface 18a may not be provided.

In the above embodiment, the light control surface 28a is provided in the part facing the light guide body 22 of the leg part 28. However, the present invention is not limited to this. The light control surface 28a may be provided in a part facing the gap 30 of the leg part 28.

DESCRIPTION OF REFERENCE NUMERALS

L1, L2, L1a, L2a light
AR1, AR2, AR3 lighting area
1 vehicle
2 vehicle body
7 back door
10 fixed-side unit
11, 21 light source
12, 22 light guide body
12a end surface
13, 23 inner housing
13a, 28b surface
14, 24 inner lens
14a inner front surface part
15, 25 outer lens
15a outer front surface part
16, 26 lamp housing
17, 27 front surface part
18, 28 leg part
18a refractive surface
19, 29 connecting part
20 movable-side unit
28a light control surface
30 gap
100 vehicle lamp

The invention claimed is:

1. A vehicle lamp comprising:
a fixed-side unit that is disposed in a fixing part of a vehicle having the fixing part and a movable part, and emits light; and
a movable-side unit that is disposed in the movable part with a gap between the fixed-side unit and the movable-side unit, and emits light, wherein
the fixed-side unit has:
a first light source;
a first light guide body that guides light of the first light source; and
a first outer lens having a first front surface part covering a front surface side of the first light guide body when the vehicle lamp is mounted on the vehicle, and a first leg part covering a side surface on the gap side of the first light guide body,
the movable-side unit has:
a second light source; and
a second light guide body that guides light of the second light source; and
a second outer lens having a second front surface part covering a front surface side of the second light guide body when the vehicle lamp is mounted on the vehicle, and a second leg part covering a side surface on the gap side of the second light guide body,
the second leg part has a light control surface which is provided in a part of the second leg part, faces the second light guide body and forms a lighting area on a front surface of the second leg part, and
the light control surface is arranged to effect control such that light emitted from at least one of the first light source and the second light source and incident on the light control surface is internally reflected by a surface on a gap side of the second leg part and then passes through inside of the second leg part to be emitted from the front surface of the second leg part.

2. The vehicle lamp according to claim 1, wherein the light control surface is provided in a part facing the second light guide body of the second leg part.

3. The vehicle lamp according to claim 2, wherein the light control surface refracts, inside the second leg part, the light that is emitted from the second light guide body and is incident on the light control surface.

4. The vehicle lamp according to claim 2, wherein the light control surface internally reflects light that is emitted from the first light source, is incident inside the second leg part from the gap side, and is incident on the light control surface from inside of the second leg part.

5. The vehicle lamp according to claim 4, wherein the first leg part has a refractive surface that refracts, inside the first leg part, light emitted from the first light guide body.

6. The vehicle lamp according to claim 1, wherein the light control surface has a serrate cross-sectional shape in a case where the second leg part is cut by a plane parallel to a horizontal plane when the vehicle lamp is mounted on the vehicle.

* * * * *